P. C. HEWITT.
SINGLE PHASE DIRECTIONAL CURRENT ARRESTER.
APPLICATION FILED MAY 23, 1903.
1,097,321.　　　　　　　　　　　Patented May 19, 1914.
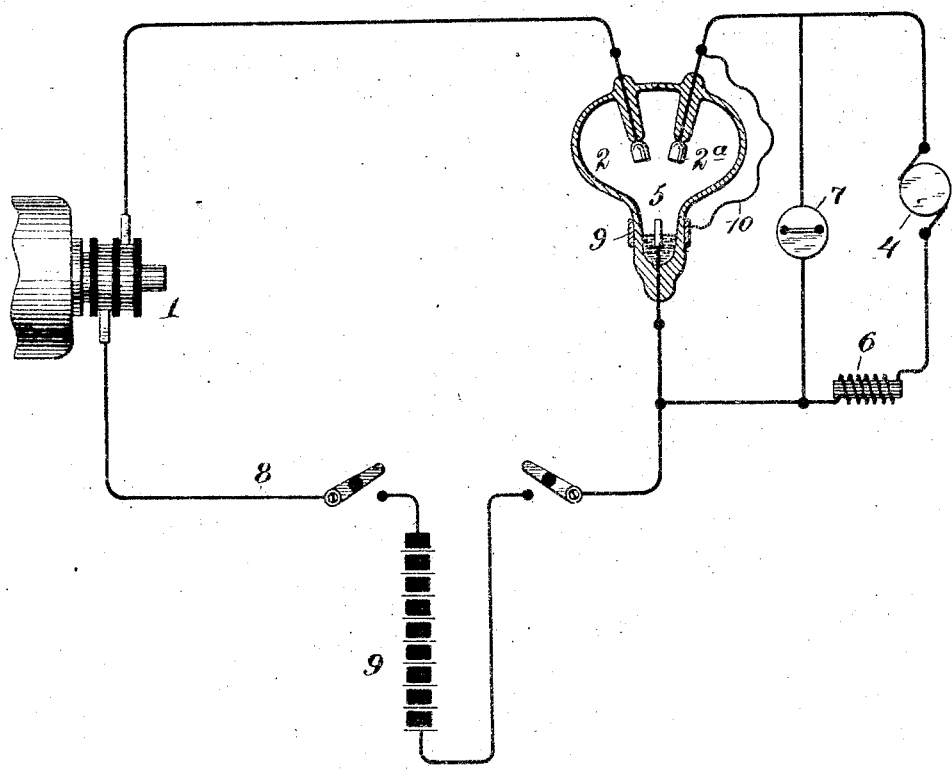
WITNESSES:　　　　　　　　　　　INVENTOR
　　　　　　　　　　　　　　　　Peter Cooper Hewitt.
　　　　　　　　　　　　　　　　BY
　　　　　　　　　　　　　　　　ATTORNEY

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN. NEW JERSEY, A CORPORATION OF NEW JERSEY.

SINGLE-PHASE-DIRECTIONAL-CURRENT ARRESTER.

1,097,321. Specification of Letters Patent. Patented May 19, 1914.

Original application filed October 30, 1902, Serial No. 129,352. Divided and this application filed May 23, 1903. Serial No. 158,458.

*To all whom it may concern:*

Be it known that I, PETER COOPER HEWITT, a citizen of the United States, and resident of New York, county of New York, State of New York, have invented certain new and useful Improvements in Single-Phase-Directional-Current Arresters, of which the following is a specification.

In certain patents granted to me on the 17th day of September, 1901, Numbers 682,690 and 682,699 inclusive, I have described a form of electric device in which a gas or vapor path is traversed by electric currents. I have also set forth certain peculiarities with reference to the so-called negative electrode reluctance. I have found, moreover, that so long as the negative electrode reluctance remains overcome there will be a tendency to permit a flow of current from the positive to the negative electrode, whereas a flow in the opposite direction is resisted by the electrode reluctance which develops when the electrode which was originally the positive electrode is changed to a negative electrode. Accordingly, if a device of this character be provided not only with means for breaking down the negative electrode reluctance but also for keeping it overcome, current may flow through the device from the positive to the negative electrode but will not flow in the opposite direction. Consequently impulses of one direction from an alternating current source will readily pass through the apparatus, while impulses of opposite direction will be restrained or prevented from passing through. In other applications filed on the 30th day of October, 1902, and numbered, respectively, 129,352 and 129,353, I show and describe more particularly apparatus in which the principles herein set forth are applied to the creating of a unidirectional current in connection with multiphase circuits. In these applications I show among other things gas or vapor electric apparatus provided with a plurality of positive electrodes, each of the positive electrodes being connected with a separate lead from a source of alternating current, whereby current may be caused to flow successively from the several positive electrodes through the device, there being presented at all times to the terminals of the device a sufficient electro-motive-force to prevent the negative electrode reluctance from reëstablishing itself. In the same applications I also show means for preventing such reëstablishment through the medium of a current supplied continuously to the device from a direct current source.

In the present application, which is a division of the application bearing the Serial Number 129,352, mentioned above, I illustrate, describe and claim the application of my invention to single phase or ordinary two-phase alternating currents. In this connection I use a supplemental positive electrode and connect with the supplemental electrode and with the negative electrode of the device a source of continuous current, so that the negative electrode reluctance after it has once been broken down will remain overcome by reason of the current flowing from this supplemental electrode. Notwithstanding the fact that there are intervals when no positive current could flow from the alternating current source, yet the negative electrode reluctance will be held in abeyance by the action of the current from the supplemental positive electrode, with the result that current in one direction only will flow through the circuit from the alternating source, although such current might be intermittent.

There are many uses to which the device may be applied, such, for instance, as operating various classes of apparatus requiring currents continuous in direction, such as electric motors therefore the charging of storage batteries, electrolytic operations, electric lighting, etc.

I have illustrated my invention in the accompanying drawing which is a diagram of circuits and apparatus adapted to carry out my invention.

In the drawing, 1 is a source of single phase alternating current having its respective terminals connected with the positive electrode, 2, and the negative electrode, 5, of a gas or vapor apparatus, of the character described in the foregoing. The supplemental electrode 2$^a$ is connected with the positive terminals of a source, 4, of direct current, the negative terminal of which is connected through a reactive device, 6, with the negative electrode 5. A switch, 7, included in a short circuit, is employed for starting the device, the same being a quick-break switch across the terminals of the source 4. Upon suddenly rupturing the short circuit by operating the switch 7, the reactive device 6 tends to discharge itself through the medium between the positive electrode $2^a$ and the negative electrode 5. The coils of the reactive device may remain in circuit as a steadying resistance, if desired. The source, 4 of continuous currents affords a sufficient electro-motive-force to prevent the negative electrode reluctance from reëstablishing itself independently of the action of the electro-motive-forces produced by the generator 1. The result will be that an intermittent current in one direction will flow through the main circuit conductor 8 and through such electrical apparatus as may be included in the work circuit 9, which may be used for electrolytic or other work.

It will be understood that the supplemental electrode $2^a$ and the negative electrode 5 constitute a distinct pair or couple of electrodes as compared with the main electrodes 2 and 5.

I claim as my invention:—

1. The combination of a source of alternating electro-motive-force, a vapor conductor including electrodes in an exhausted receptacle, one at least of said electrodes being of vaporizable material, and means in circuit with the vapor conductor for consuming current flowing from said source.

2. The combination of a source of alternating electro-motive-force, a vapor conductor including electrodes in an exhausted receptacle, one at least of said electrodes being adapted to emit vapor, connections between said source and said vapor conductor, and means for consuming uni-directional current flowing through said vapor conductor.

Signed at New York, in the county of New York, and State of New York, this 19th day of May, A. D. 1903.

PETER COOPER HEWITT.

Witnesses:
 WM. H. CAPEL,
 GEORGE H. STOCKBRIDGE.